United States Patent [19]

Myking et al.

[11] Patent Number: 5,206,472
[45] Date of Patent: Apr. 27, 1993

[54] SYSTEM FOR USE IN ELECTRODE WELDING AND GAS/ARC WELDING

[76] Inventors: Reidar Myking, Postboks 45, N-5100 Isdalsto; Oystein Vetas, N-5123 Saebovagen, both of Norway

[21] Appl. No.: 778,133

[22] PCT Filed: Jun. 12, 1990

[86] PCT No.: PCT/NO90/00103
§ 371 Date: Dec. 10, 1991
§ 102(e) Date: Dec. 10, 1991

[87] PCT Pub. No.: WO90/15687
PCT Pub. Date: Dec. 27, 1990

[30] Foreign Application Priority Data

Jun. 12, 1989 [NO] Norway .................. 892390

[51] Int. Cl.⁵ .................................. B23K 9/167
[52] U.S. Cl. ............................ 219/75; 219/136; 219/138
[58] Field of Search .................. 219/75, 136, 138

[56] References Cited

U.S. PATENT DOCUMENTS

| | | | |
|---|---|---|---|
| 3,116,406 | 12/1963 | Barnes | 219/75 |
| 3,263,055 | 7/1966 | Broderick et al. | 219/75 |
| 3,557,337 | 1/1971 | Sipos et al. | 219/75 |
| 3,739,140 | 6/1973 | Rotilio | 219/75 |
| 4,142,086 | 2/1979 | Rotilio | 219/75 |

Primary Examiner—Clifford C. Shaw
Attorney, Agent, or Firm—Francis C. Hand

[57] ABSTRACT

The electrode holder is provided with a handle and a screw threaded current conductor which is adapted to alternatively receive two fastening heads. One fastening heads includes a current-conducting clamping member which is threaded onto the screw-threaded portion of the holder and has a bore for receiving a consumable electrode therein for clamping between the screw-threaded portion of the current conductor and the clamping member. The second fastening head also has a clamping member threaded onto the screw-threaded portion of the holder as well a coupling bushing for coupling with a source of gas, a gas passage extending from the bushing for conducting a flow of gas about one end of an arc electrode secured in the fastening head and a control valve for adjusting the flow of gas in the passage and thus to and along the arc electrode.

4 Claims, 1 Drawing Sheet

SYSTEM FOR USE IN ELECTRODE WELDING AND GAS/ARC WELDING

The present invention relates to a system for use in alternately electrode welding and gas/arc welding (TIG-welding).

In conventional electrode welding, electric current is employed for fusing of a fusion electrode which is secured in an electrode-carrying head. Preferably, the fixing of the fusion electrode or the release of the fusion electrode is effected by screwing of a handle with an associated current conductor relative to the fusion electrode and an associated fastening head. When the fusion electrode is consumed, it is replaced with a new electrode by screwing the handle with the current conductor relative to the electrode-carrying head.

In gas/arc welding (TIG-welding) special TIG-equipment is employed which comprises a burner with an associated (argon) gas conduit from a source of gas and an electrode holder having a tungsten electrode and associated current cable from a source of supply. Hitherto, a combined holder for the burner and the electrode and a common conduit for the argon gas and the current cable have been employed. In conventional electrode welding, current cables are most often employed which are extendable by means of cable joints. It is also possible to employ equivalent, but more complicated and expensive joints for the common conduit for the argon gas and the current cable in TIG-welding. Argon gas is non-combustible.

U.S. Pat. No. 3,263,055 describes an arc welding apparatus including a torch, an inert gas conduit in the torch and a non-consumable electrode in the conduit. The torch is gripped in the jaws of a stick electric holder by the operator in order to perform a welding operation on a workpiece. In addition, the control valve is provided for regulating the inert gas supplied to the electrode.

Hitherto, it has been usual to employ separate equipment for electrode welding and gas/arc welding respectively. In practice, it has been cumbersome to employ two separate sets of equipment for conventional electrode welding and for TIG-welding. In addition, large costs are involved in having to invest and maintain two separate sets of equipment for one and the same user at different locations of use.

U.S. Pat. No. 3,739,140 describes a combination welding torch for use in alternate electrode welding and gas/arc welding (TIG-welding). The torch includes a current supply cable and a gas conduit in connection with a holder having an associated electrode-carrying head. An electrode is to be firmly clamped with an adjustable gripping engagement between the head and a current conductor member to which the head is firmly clamped. The holder with an associated current conductor member is surrounded by a handle and the holder with the associated conductor member is common for exchangeable first and second electrode-carrying heads. The first head serves to secure a welding electrode for electrode welding while the second head serves to secure an arc electrode for gas/arc welding while also forming a support for a coupling member for coupling to a gas conduit. In this construction, however, selecting one or the other of the electrodes involves shifting a number of separate, rather small and tiny parts in succession. This shifting operation may involve complications for an operator, especially at unshielded outdoor working locations.

Accordingly, it is an object of the invention to provide a combination electrode welding and gas/arc welding apparatus which can be used in electrode welding and in TIG-welding by simply switching an electrode holder head.

It is another object of the invention to use a common arrangement of current supplied cables for purposes of electrode welding and gas/arc welding.

It is another object of the invention to be able to employ arbitrarily long and especially robust current supply cables for a combination welding torch.

It is another object of the invention to be able to readily switch from a conventional electrode welding apparatus to a TIG-welding apparatus by a simple exchange of components in a common holder.

Briefly, the invention provides the combination of an electrode holder and two fastening heads for selectively securing electrodes to the holder.

The electrode holder is constructed with a handle, a current-conducting cable extending from the handle and a current conductor connected to the cable within the handle. This conductor also has a screw-threaded portion extending outside the handle to selectively receive the respective fastening heads.

The first fastening head includes a current-conducting clamping member having an internal screw thread for threading onto the current conductor of the holder and a transverse bore at one end for receiving an electrode therein for clamping between the screw-threaded portion of the current conductor and the clamping member.

The second fastening head serves to selectively secure an arc electrode to the current conductor of the holder. This second fastening head includes a current-conducting clamping member having an internal screw thread for threading onto the current conductor of the holder and a transverse bore at one end for receiving an arc electrode for clamping between the screw-threaded portion of the current conductor and the clamping member. In addition, the fastening head includes a coupling bushing for coupling with a source of gas, a gas passage extending from the bushing for conducting a flow of gas around one end of an arc electrode secured to the clamping means and a control valve for adjusting the flow of gas int the passage.

According to the invention, it is possible by this to employ standard equipment for conventional electrode welding, according to a normal arrangement, and immediately there is a need for TIG-welding, one can quite simply exchange the electrode welding head with a TIG-head having associated equipment, including a separate gas conduit. In this way, it is sufficient for the user to bring to the location of use a gas container, the gas conduit and the TIG-head and otherwise utilise the robust construction for conventional electrode welding.

Further features of the invention will be evident from the following description of a preferred embodiment, having regard to the accompanying drawings, in which.

Figure 1:
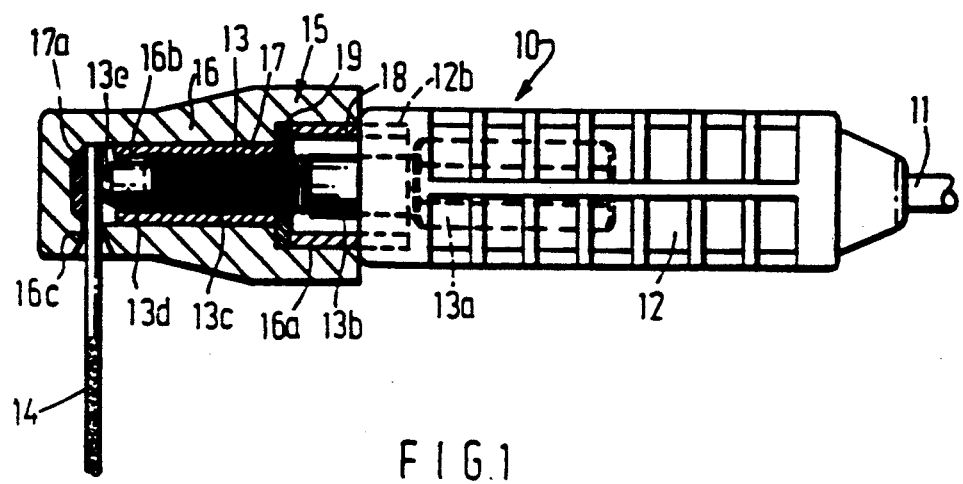
FIG. 1 shows partially in side elevation and partially in vertical section an electrode holder used for conventional electrode welding.

In FIG. 1 there is shown a known construction of an electrode holder 10 for conventional electrode welding. There is shown a current conducting cable 11 which passes endways inwardly into a handle 12 of rubber. Internally in the handle the current cable 11 is conductively connected to a current conductor 13. The current conductor 13 is secured with a friction-forming fastening portion 13a, in a manner not shown further, internally in the handle 12, with heat insulation between the handle 12 and the current conductor 13. The current conductor 13 projects with a stem portion 13b outwardly via a cavity in the handle 12 and a distance outside the handle and continues with a screw-threaded portion 13c towards a graduated end portion 13d. The outermost end 13e of the current conductor 13 forms a current-conducting clamp portion for engagement with a fusion or welding electrode 14.

A separate fastening head 15 for securing the electrode 14 to the current conductor 13 is fixed in place on the current conductor 13 axially outside the handle 12. The head 15 comprises an external head portion 16 of hardened plastic or similar material which tolerates high temperatures and strong impacts, at the same time as it contributes electrical insulation and heat insulation. The head portion 16 is provided with an axially inner, current-conducting clamping member 17 and an axially outer fastening member 18 together with an intermediate, disc-shaped locking member 19. The fastening member 18 is locatable in a cavity 16a in the head portion 16 via a snap-forming engagement means (not shown), with which the fastening member 18, the locking member 19 and the clamping member 17 are held in place in the head portion 16. The clamping member 17 can for example be provided with longitudinal ribs which are axially displaceably guided in corresponding grooves in an inner cavity 16b in the head portion 16 and which prevent the clamping member 17 from turning relative the head portion 16.

By means of the external screw thread on the current conductor 13 and a corresponding internal screw thread in the clamping member 17, the fastening head 15, that is to say the head portion 16 with clamping member 17, fastening member 18 and locking member 19, can be located, as a protective casing, in place on the current conductor 13. The locating is effected by relative rotation between the handle 12 and the fastening head 15.

In the inner end of the clamping member 17, the clamping member is provided with a through, transversely extending bore 17a, which is in alignment with a one-sided, transversely extending bore 16c in the head portion 16. The outer end 13e of the current conductor 13 is adapted to be introduced laterally via the cavity 16b in the bore 17a so as to be able to be tensioned against the one side of the fusion or welding electrode 14 which is introduced via the bore 16c to the cavity 16b. The opposite side of the electrode 14 is clamped against the adjacent side of the bore 17a in a current-conducting clamping engagement.

On exchanging the electrode 14, the clamping engagement is loosened by a minor relative rotation between handle 12 with current conductor 13 and fastening head 15. On exchanging the fastening head 15 this is effected by a more extensive relative rotation between the handle 12 with the current conductor 13 and the fastening head 15, determined length of the screw thread.

Figure 2:
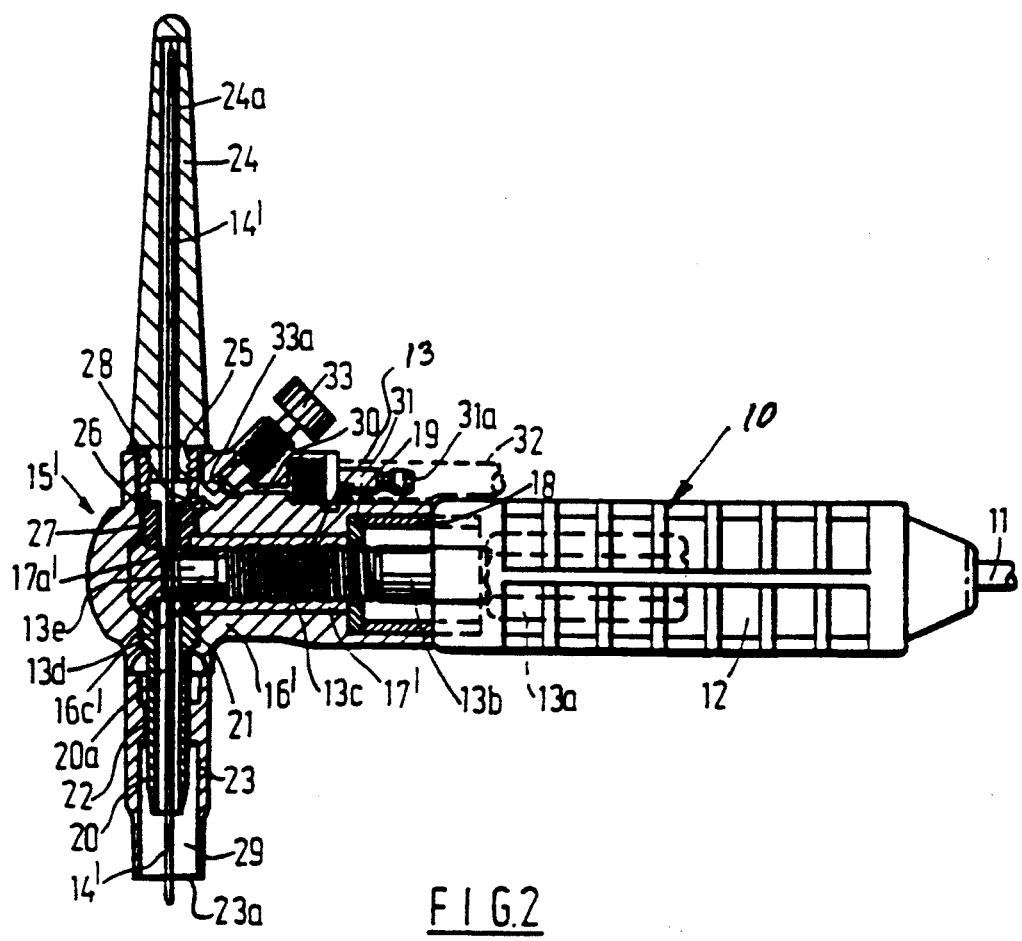
FIG. 2 shows in a corresponding elevation/section the electrode holder used for TIG-welding.

In FIG. 2 there is shown an electrode holder 10 having the same current cable 11, handle 12 and current conductor 13 as shown in FIG. 1, but illustrated with an exchanged fastening head 15'. A head portion 16' is shown of corresponding construction to the head portion 16 in FIG. 1, but with a somewhat differing shape and with diverse extra equipment. More specifically, a clamping member 17' is employed which is secured in an equivalent manner to the clamping member 17 according to FIG. 1 by means of fastening member 18 and locking member 19. In the clamping member 17' there is a transversely extending, through bore 17a' in which there is located an electrode 14' in a manner corresponding to that which is described according to FIG. 1. The electrode 14' is a relatively thin, point ending tungsten electrode, which projects endways outwardly to opposite sides of the current conductor 13.

On the one side of the current conductor 13, the electrode 14' passes through a bore 20a in a metal bushing 20, which with a first external screw thread 21 at one end of the bushing 20 is connected to an equivalent internal screw thread in a laterally directed bore 16c' in the head portion 16'. By means of a second external screw thread 22 at the middle portion of the bushing 20, a sleeve 23 of ceramic material is fastened via an equivalent internal thread to the bushing 20, tightly connected to the head portion 16'. As illustrated 20 the electrode 14 projects a substantial distance beyond the bushing 20 and a relatively short distance beyond the sleeve 23.

On the opposite side of the current conductor 13, the electrode 14' passes through a dead ending bore 24a in a cap-forming sleeve 24. The sleeve 24 is fastened by means of an external screw thread 25 to an equivalent internal screw thread in the one end of a bushing 26. At the opposite end, the bushing 26 is fastened by means of an external screw thread 27 to an equivalent internal screw thread in the bore 16c' in the head portion 16'. A transversely extending bore 28 is illustrated in the bushing 26. The bore 28 communicates on the one side with a gas passage through the bushing 26, the bore 17a' in the clamping member 17 and the bushing 20, the gas passage discharging into an open chamber 29 just within the mouth 23a of the sleeve 23. On the other side, the bore 28 communicates with a duct 30 through the head portion 16' and a coupling bushing 31 fastened to this for the supply of argon gas. A gas conduit is indicated by broken lines 32. The bushing 31 and the gas conduit 32 are provided with equivalent rapid coupling parts, such as indicated at a bushing head 31a. By means of a needle valve 33, which is axially adjustable towards and away from a valve seat 33a in connection with the duct 30, the supply of gas from the gas conduit 32 to the passage along the electrode 14' can be adjusted. By a normal hand grip about the handle 12, it is relatively easy to adjust the needle valve 33 with a finger grip during use of the electrode holder.

In practice, the fastening head 15' can if necessary be more or less constantly coupled to the gas conduit 32, so that the fastening head 15' with associated gas conduit 32 can be transported together with a gas container (not shown herein) to the location of use and there handle 12 and current conductor 13 of the holder are coupled immediately there is a need for TIG-welding. In other words, one can readily shift thereby from conventional electrode welding to TIG-welding, and vice-versa, by quite simply exchanging the fastening heads 15 and 15' with each other.

We claim:
1. In combination,
   an electrode holder having a handle, a current-conducting cable extending from said handle, and a current conductor connected to said cable within said handle, said conductor having a screw-threaded portion extending outside said handle;

a first fastening head for selectively securing a first electrode to said current conductor, said head including a first current-conducting clamping member having an internal screw thread for threading onto said current conductor of said holder and a transverse bore at one end for receiving an electrode therein for clamping between said screw-threaded portion of said current conductor and said current-conducting clamping member; and a second fastening head for selectively securing an arc electrode to said current conductor, said second fastening head including a second current-conducting clamping member having an internal screw thread for threading onto said current conductor of said holder and a transverse bore at one end for receiving an arc electrode therein for clamping between said screw-threaded portion of said current conductor and said second current-conducting clamping member, a coupling bushing for coupling with a source of gas, a gas passage extending from said bushing for conducting a flow of gas about one end of an arc electrode secured to said second clamping member, and a control valve for adjusting the flow of gas in said passage.

2. The combination as set forth in claim 1 wherein said first fastening head includes an external head portion of electrical insulating material surrounding said first clamping member, said head portion having a bore in alignment with said bore in said first clamping member to receive the first electrode therein.

3. The combination as set forth in claim 1 wherein said second fastening head includes a metal bushing extending transversely of said second clamping member to receive the arc electrode therein and defining a part of said gas passage.

4. The combination as set forth in claim 3 wherein said second fastening head includes a cap-forming sleeve extending transversely of said second clamping member and in alignment with said bushing to receive one end of the arc electrode therein.

* * * * *